United States Patent [19]
Kim

[11] Patent Number: 5,978,021
[45] Date of Patent: Nov. 2, 1999

[54] APPARATUS PRODUCING A HIGH DEFINITION PICTURE AND METHOD THEREOF

[75] Inventor: Seong-Hun Kim, Suwon, Rep. of Korea

[73] Assignee: Samsung Electronics Co., Ltd., Kyungki-Do, Rep. of Korea

[21] Appl. No.: 08/103,207

[22] Filed: Aug. 9, 1993

[30] Foreign Application Priority Data

Aug. 8, 1992 [KR] Rep. of Korea ..................... 92-14297

[51] Int. Cl.⁶ ........................................... H04N 5/225
[52] U.S. Cl. .......................................... 348/218; 348/230
[58] Field of Search ................................ 348/230, 426, 348/625, 385, 343, 344, 218; 358/451, 506, 443; 250/216; 359/487

[56] References Cited

U.S. PATENT DOCUMENTS

| | | | |
|---|---|---|---|
| 3,113,180 | 12/1963 | Bingley et al. | 348/206 |
| 4,383,170 | 5/1983 | Takagi et al. | 250/216 |
| 4,616,262 | 10/1986 | Toriumi et al. | 348/597 |
| 4,692,812 | 9/1987 | Hirahara et al. | 358/443 |
| 5,048,926 | 9/1991 | Tanimoto | 359/487 |
| 5,282,060 | 1/1994 | Kizu et al. | 358/461 |

*Primary Examiner*—Wendy Garber
*Assistant Examiner*—Andrew B. Christensen
*Attorney, Agent, or Firm*—Sughrue, Mion, Zinn, Macpeak & Seas, PLLC

[57] ABSTRACT

An imaging apparatus for imaging an object to produce a high resolution picture from video camera using a charge coupled device having a lower resolution includes an optical processor for segmenting into N pieces and extending N times a received optical image, a device for converting each segmented and extended one of the N pieces to a respective electrical signal and a signal processor for reading all of the respective electrical signals in a predetermined order to thereby process the segmented optical image sequentially so that a high resolution image can be obtained without utilizing a high pixel count charge coupled device. A method for forming high resolution images is also disclosed.

15 Claims, 3 Drawing Sheets

APPARATUS PRODUCING A HIGH DEFINITION PICTURE AND METHOD THEREOF

BACKGROUND OF THE INVENTION

1. Field of the Invention

The present invention relates to an imaging apparatus for imaging an object by way of a Charge Coupled Device (CCD) and, more particularly, to an apparatus for generating a high definition picture in a video camera by segmenting a received image into N pieces and extending each of the N pieces times to thereby process the segmented received image sequentially, so that a high definition image can be obtained without utilizing a high resolution CCD containing a high number of pixels. A method for producing high definition image signals using a CCD imager having a lower resolution level is also disclosed.

2. Description of the Prior Art

In a typical imaging apparatus utilizing a CCD, the number of pixels comprising the CCD must be increased to obtain a high resolution picture. In will be noted that reduction of pixel size is a requirement for increasing the number of pixels in the CCD and that pixel size reduction is effective up to a certain point; a practical limit appears to be 768 pixels allocated to one horizontal line.

As noted above, because there has been a limitation in the increase in the number of pixels in the CCD, provision of a CCD device classified as being within an optical series designated for a high definition pictures in, e.g., a video camera, has been difficult.

SUMMARY OF THE INVENTION

Accordingly, it is the principal object of the present invention to provide an apparatus for producing a high definition picture in a video camera.

Accordingly, it is one object of the present invention to provide an apparatus for producing a high definition picture in a video camera without an increase in the number of pixels formed in a charge coupled device (CCD).

Accordingly, it is another object of the present invention to provide an apparatus for producing a high definition picture in a video camera at low cost by segmenting and then extending an image received by a CCD without increasing the number of pixels and circuitry to compensate for time differences between the segmented images so that a high resolution picture can be obtained.

These and other objects, features and advantages of the invention are provided by high definition picture circuitry particularly adapted for use in a video camera including an optical processor for segmenting a received image into N pieces and extending each of the pieces to N times in a predetermined dimension, an optical converter for converting each received piece to an electrical signal and a signal processor for generating a restored image signal corresponding collectively to the N pieces of the received image.

These and other objects, features and advantages of the invention are provided by an electro-optical imaging apparatus for an electronic camera producing a high definition image signal, which includes an optical processor having a first optical path receiving an optical image and generating a first image portion which is extended in a predetermined direction producing a first extended image portion, and a second optical path receiving the optical image and generating a second image portion which is extended in the same direction producing a second extended image portion, a CCD receiving the first and second extended image portions during first and second time periods for generating respective first and second image signals and a signal processor receiving the first and second image signals for reading the first and second image signals in a predetermined order to thereby generate the high definition image signal.

These and other objects, features and advantages of the invention are provided by a method for producing a high definition image signal in an electrooptical imaging apparatus for an electronic camera including a CCD device containing N pixels, where N is an integer and where N is much greater than 1, in a first direction. The method includes steps for providing a first image signal corresponding to a first extended image portion and a second image signal corresponding to a second extended image portion and reading the first image signal and the second image signal in a predetermined order so as to generate the high definition image signal containing more than N pixels. Preferably, the first extended image portion corresponds to a first portion of an optical image which is extended to thereby include N pixels, the second extended image portion corresponds to a second portion of the optical image which is extended to thereby include N pixels, and the first extended image portion and the second extended image portion correspond to different areas of the optical image.

These and other objects, features and advantages of the invention are disclosed in or apparent from the following description of preferred embodiments.

BRIEF DESCRIPTION OF THE DRAWINGS

A fuller understanding of the nature and objects of the invention can be achieved by reference to the following detailed description taken in conjunction with the accompanying drawings in which.

DETAILED DESCRIPTION OF THE INVENTION

Hereinafter, the construction of an apparatus for generating a high definition picture in an electronic video camera is described in detail with reference to the accompanying drawings.

Figure 1:
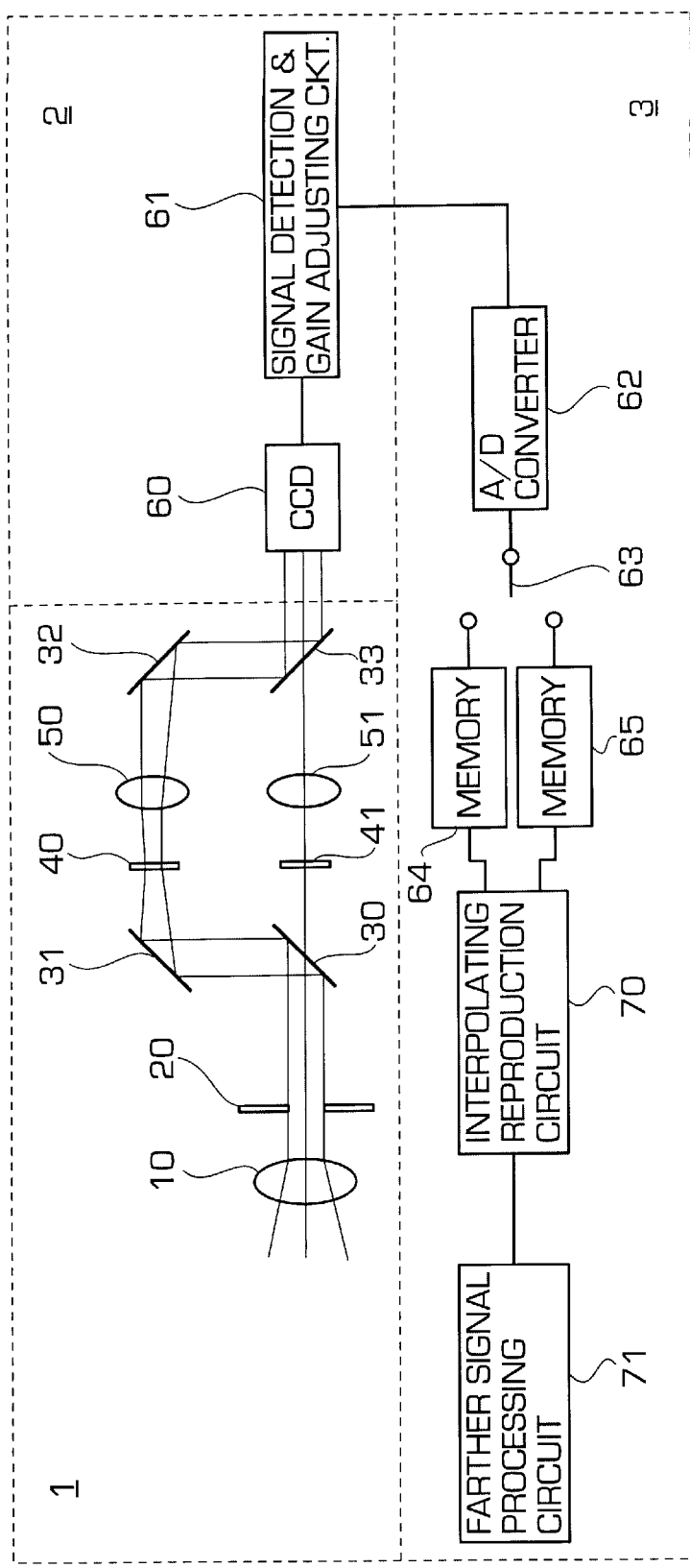
FIG. 1 is a block diagram of one embodiment in accordance with the present invention.

FIG. 1 is a block diagram of a preferred embodiment in accordance with the present invention wherein the apparatus includes an optical processor 1 for segmenting light incident from an object into N pieces and extending each piece N times, an optical converter 2 for converting the incident light segmented into N pieces and extended N times at the optical processor into corresponding electrical signals and a signal processor 3 for processing the electrical signals output from the optical converter 2 into a high definition picture corresponding to the incident light from the object.

The optical processor 1 advantageously includes a light collecting lens 10 for collecting light incident from the object, an iris 20 for controlling the quantity of light passed by the light collecting lens 10 and a light segmenting mirror 30 for segmenting the incident light corresponding to one screen passed through the iris 20 into N paths. A first optical path includes a first correcting mirror 31 for correcting to one side the direction of the light path segmented by the light segmenting mirror 30, a liquid crystal shutter 40 for transmitting a respective incident light to mirror 31 in response to a first control signal, an extending lens 50 for extending N times the incident light transmitted from the liquid crystal shutter 40, and second and third correcting mirrors 32 and 33 for transmitting to optical converter 2 the incident light extended by extending lens 50. A second optical path includes a liquid crystal shutter 41 for sequentially transmitting a respective light produced by mirror 30 in response to a second control signal, extending lens 51 for extending N times the incident light transmitted from liquid crystal shutter 41, and third correcting mirror 33 for transmitting to the optical converter 2 the incident light extended by extending lens 51.

Preferably, optical converter 2 includes a CCD 60 for converting the incident light transmitted via the first and second optical paths to first and second electrical signals and a signal detecting & gain adjusting unit 61 for detecting the first and second electrical signals produced by CCD 60 to amplify, and thereby produce, the same as signals having predetermined magnitudes.

The signal processor 3 advantageously includes an analog-to-digital (A/D) converter 62 for converting the amplified first and second electrical signals into first and second digital signals, respectively, first and second memories 64 and 65 for storing respective first and second digital signals produced from the A/D converter 62 and an interpolating reproduction unit 70 for compensating for time differences of the-picture signals stored in memories 64 and 65 to thereafter output picture signals corresponding to the object to a further signal processing circuit 71.

The operation of the thus constructed apparatus will now be described while referring to FIGS. 2 and 3 in detail.

Figure 3A:
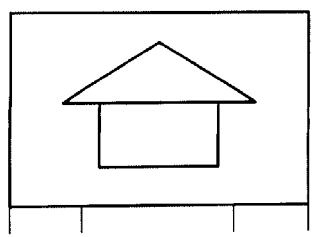
FIGS. 3A through 3F are illustrative drawings which are useful in explaining the operation of the present invention.
Figure 3B:
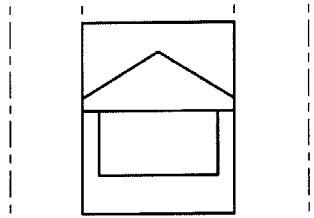
Figure 3C:
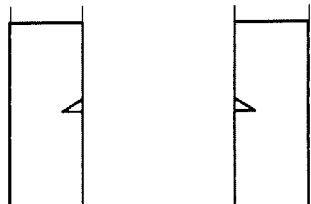
Figure 3D:
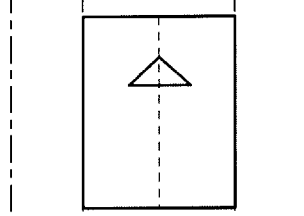

When the object depicted in FIG. 3A is imaged, the amount of incident light collected by the light collecting lens 10 and transmitted via the first and second optical paths of FIG. 1 is controlled by iris 20. This incident light is then segmented into 2 paths by the light segmenting mirror 30. In other words, when light corresponding to one screen, as illustrated in FIG. 3A, is received via iris 20, light segmenting mirror 30 passes a part as illustrated in FIG. 3B and reflects a part as illustrated in FIG. 3C. It will be appreciated that the light reflected by light segmenting mirror 30 is incident to the first correcting mirror 31, which corrects the path of light incident from light segmenting mirror 30 to a direction parallel to the first received incident light and at the same time, collects the incident light segmented as depicted in FIG. 3C to the center of the screen as shown in FIG. 3D.

Meanwhile, the light which has passed the light segmenting mirror 30 as illustrated in FIG. 3B enters the liquid crystal shutter 41. The light path corrected at the first optical path correcting mirror 31 and collected and corrected to the center, as shown in FIG. 3D, enters the liquid crystal shutter 40. The liquid crystal shutter 40 passes the incident light in response to a first control signal, e.g., the first control signal illustrated in FIG. 2A, while the second liquid crystal shutter 41 passes the light incident in response to the second control signal, e.g., illustrated in FIG. 2B.

Figure 2A:
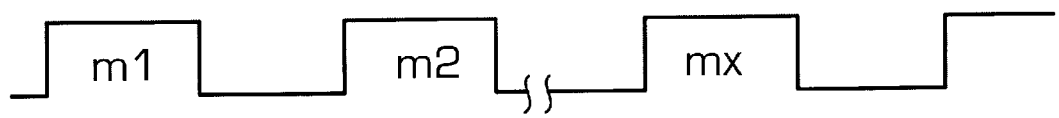
FIGS. 2A and 2B are waveform diagrams of control signals applied to a plurality of liquid crystal shutters disposed in the optical paths illustrated in FIG. 1 in accordance with the present invention.
Figure 2B:

Accordingly, the incident light arriving at the liquid crystal shutters 40 and 41 is delivered to CCD 60 in response to first and second control signals applied in a predetermined order, e.g., m1, n1, m2, n2, . . . , $m_x$, $n_x$, as illustrated in FIGS. 2A and 2B.

It should be noted that the incident light passed sequentially by the liquid crystal shutters 40 and 41 is extended horizontally by the extending lenses 50 and 51 in accordance with the number of paths. In other words, if the number of paths provided by the optical processor 1 is 2 paths, the incident light illustrated in FIG. 3B which has passed the liquid crystal shutter 41 is extended two times horizontally at the extending lens 51, as illustrated in illustrated in FIG. 3E. Preferably, the incident light illustrated in FIG. 3D which has passed the liquid crystal shutter 40 is extended two times horizontally at the extending lens 50 as illustrated in FIG. 3F.

The incident lights extended at the extending lenses 50 and 51 enter the third path correcting mirror 33, with the incident light extended by extending lens 50 being directed to mirror 33 via second correcting mirror 32. The second and third correcting mirrors 32 and 33 correct light rejoining the main path so that light from both paths is coincident.

The incident lights whose paths have been corrected then enter CCD 60, which converts the light segmented and sequentially incident to produce and output first and second electrical signals. In other words, the light extended at the extending lens 51 to thereby be incident, as illustrated in FIG. 3E, is converted to the first electrical signal and the light extended at the extending lens 50 to thereby be incident, as illustrated in FIG. 3F, is converted and output as the second electrical signal.

Figure 3E:
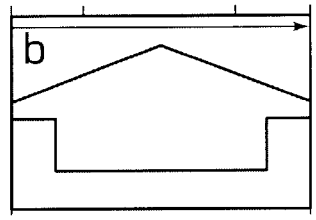
Figure 3F:
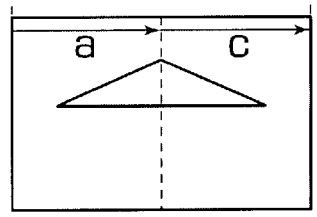

At this moment, even though the incident light is extended two times horizontally as illustrated in FIGS. 3E and 3F, the area of the incident light imaged by CCD 60 is the same. Since the electrical signals output by CCD 60 can be feeble signals, these signals advantageously can be detected by a signal detecting & gain adjusting circuit 61 and, thus, can be amplified to a predetermined levels before being output to downstream circuit elements.

Preferably, A/D converter 62 converts the analog first and second electrical signals amplified to a predetermined level by the signal detecting & gain adjusting circuit 61 to produce and output first and second digital signals. The first and second digital signals output by A/D converter 62 are stored in respective memories 64 and 65 corresponding to respective light paths of the optical processor 1. In other words, the digital signals corresponding to the incident light illustrated in FIG. 3E, which has been passed through liquid crystal shutter 41, is selectively passed by way of switch 63 and is stored in corresponding memory 64. In the same way, the digital signal corresponding to the incident light illustrated in FIG. 3F, which has passed through liquid crystal shutter 40, is stored in memory 65.

The interpolating reproduction circuit 70 reads from memory 65 a digital signal corresponding to arrow a of FIG. 3F, reads from memory 64 a digital signal corresponding to arrow b of FIG. 3E and reads from memory 65 a digital signal corresponding to arrow c of FIG. 3F to output a high definition signal to further signal processing circuit 71. Accordingly, even though the further signal processing circuit 71 is connected to a CCD 60 having the same number of pixels as a lower resolution CCD, the resultant signal output via further signal processing circuit 71 ends up as signal having at least twice the resolution as that produced by the lower resolution CCD.

As seen from the foregoing, the present invention can obtain the effect of screen having more than twice its nominal resolution even though the CCD having the same number of pixels is utilized.

The foregoing description and drawings are illustrative and are not to be taken as limiting. Still other variations and modifications are possible without departing from the spirit and scope of the present invention. For example, even though the present invention has extended the light horizontally, an increase of resolution in the vertical direction by way of vertical extension can advantageously be provided. It should also be noted that increases in both horizontal and vertical directions are all possible by way of horizontal and vertical extensions.

Furthermore, even though the operation and configuration provided above with respect to first and second light paths, this explanation should be taken as exemplary, not as limiting. Thus, the light path can be extended to accommodate an increase of resolution or magnitude of the CCD, and the memory can advantageously be increased in accordance with the increase in the number of the light paths.

Still furthermore, although the present invention has segmented one screen into 2 paths of center and left/right sides, it should be apparent that the technical implementation is not limited to the present invention but the path can be segmented into 2 parts around the center to thereby be extended.

According to another aspect of the present invention, even though the incident light has been segmented and then extended, the object of the present invention can be achieved by extending the incident light first and then segmenting the image before processing. In other words, it should be noted that changes in process sequences can advantageously achieve the objects of the present invention and, thus, fall within the spirit and scope of the invention defined in the appended claims.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An apparatus generating a high definition picture in a video camera, said apparatus comprising:
   an optical processor for segmenting a received image into N pieces, where N is an integer greater than 1, and extending each of said N pieces N times in a predetermined direction;
   an optical convertor for converting each of said N pieces into a respective Nth electrical signal; and
   a signal processor receiving each respective Nth electrical signal for interpolating and generating a high definition picture corresponding collectively to said N pieces of said received image.

2. The apparatus as defined in claim 1, wherein the optical processor comprises:
   a first optical path including:
      a first shutter, said first shutter operable in response to a first control signal;
      a first extending lens for extending a first of said N pieces N times; and
   a second optical path including:
      a second shutter, said second shutter operable in response to a second control signal; and
      a second extending lens for extending a second of said N pieces N times.

3. The apparatus as defined in claim 2, wherein said first optical path further comprises a light segmenting mirror for segmenting into N paths respective said N pieces of said received image, a first correcting mirror for correcting a direction of light received from said light segmenting mirror and a second correcting mirror and a third correcting mirror for transmitting to said optical converter said first of said N pieces.

4. The apparatus as defined in claim 1, wherein the optical converter comprises:
   a CCD for converting said each of said N pieces into said respective Nth electrical signal; and
   a signal detecting & gain adjusting circuit for detecting and amplifying each said respective Nth electrical signal so as to produce each said respective Nth electrical signal having a predetermined magnitude.

5. The apparatus as defined in claim 1, wherein the signal processor comprises:
   an analog-to-digital converter for converting to digital signals said each respective Nth electrical signal;
   a plurality of memories each storing a respective one of said digital signals corresponding to said respective Nth electrical signal; and
   an interpolating reproduction circuit compensating for a time difference between digital signals stored in said memories so as to output said high definition picture.

6. The apparatus as defined in claim 1, wherein the signal processor comprises:
   an analog-to-digital converter for converting to digital signals said each respective Nth electrical signal;
   a plurality of memories each storing a respective one of said digital signals corresponding to said respective Nth electrical signal; and
   an interpolating reproduction circuit compensating for a time difference between digital signals stored in said memories so as to output said high definition picture, and
   wherein a first one of said digital signals corresponds to a center section of said high definition picture and a second one of said digital signals corresponds to first and second sections of said high definition picture, said first section, said center section and said second section being arranged in that order.

7. An electro-optical imaging apparatus for an electronic camera producing a high definition image signal, said imaging apparatus comprising:
   an optical processor having a first optical path receiving an optical image and generating a first image portion, said first image portion being extended in a predetermined direction to thereby produce a first extended image portion, and a second optical path receiving said optical image and generating a second image portion, said second image portion being extended in said predetermined direction to thereby produce a second extended image portion;
   a CCD receiving said first extended image portion and said second image portion during respective first and second time periods for generating respective first and second image signals; and
   a signal processor receiving said first and second image signals for reading and interpolating said first and second image signals in a predetermined order for generating said high definition image signal.

8. The electro-optical imaging apparatus as defined in claim 7, wherein said first optical path comprises a first shutter operable in response to a first control signal and wherein said second optical path comprises a second shutter operable in response to a second control signal, and wherein said CCD receives said first extended image portion and said second image portion during said respective first and second time periods in response to respective ones of said first and second control signals for generating respective first and second image signals.

9. The electro-optical imaging apparatus as defined in claim 7, wherein said signal processor further comprises a first memory and a second memory, and wherein said respective first and second image signals are stored in said first memory and said second memory, respectively, in response to respective ones of first and second control signals.

10. The apparatus as defined in claim 7, wherein said signal processor receiving said first and second image signals comprises means for interpolating said first and second image signals so as to compensate for time differences between said first and said second image signals.

11. The apparatus as defined in claim 7, wherein said signal processor receiving said first and second image signals comprises means for interpolating said first and second image signals so as to compensate for time differences between said first and said second image signals and for combining a first portion of said first image signal, said second image signal, and a second portion of said first image signal.

12. A method for producing a high definition image signal in an electro-optical imaging apparatus for an electronic camera including a CCD device containing N pixels, where N is an integer and where N is much greater than 1, in a first direction, said method comprising the steps of:

(a) providing a first image signal corresponding to a first extended image portion and a second image signal corresponding to a second extended image portion; and (b) reading and interpolating said first image signal and said second image signal in a predetermined order so as to generate said high definition image signal containing more than N pixels, wherein said first extended image portion corresponds to a first portion of an optical image which is extended to thereby include N pixels, wherein said second extended image portion corresponds to a second portion of said optical image which is extended to thereby include N pixels, and wherein said first extended image portion and said second extended image portion correspond to different areas of said optical image.

13. The method for producing a high definition image signal as defined in claim 12, wherein said step (b) comprises the steps of:

(c) storing said first image signal;

(d) storing said second image signal; and (e) reading said first image signal and said second image signal in a predetermined order so as to generate said high definition image signal corresponding to said first extended image portion and said second extended image portion and containing more than N pixels.

14. The method for producing a high definition image signal as defined in claim 12, wherein said step (b) further comprises:

(b) reading and interpolating said first image signal and said second image signal in a predetermined order so as to generate said high definition image signal compensated for time differences between said first and said second image signals and containing more than N pixels.

15. The method for producing a high definition image signal as defined in claim 12, wherein said step (e) comprises:

(e) reading a first portion of said first image signal, said second image signal, and a second portion of said first image signal, in that order, so as to generate said high definition image signal corresponding to said first extended image portion having first and second sections disposed on either side of said second extended image portion and containing more than N pixels.

* * * * *